United States Patent [19]

Claeys et al.

[11] Patent Number: 5,882,787
[45] Date of Patent: Mar. 16, 1999

[54] SEMIRIGID POLY-EPSILON-CAPROLACTONE FILM AND PROCESS FOR PRODUCING IT

[75] Inventors: Ivan Claeys, Zemst; Claude Dehennau, Waterloo, both of Belgium

[73] Assignee: Solvay (Société Anonyme), Brussels, Belgium

[21] Appl. No.: 751,971

[22] Filed: Nov. 19, 1996

[30] Foreign Application Priority Data

Nov. 22, 1995 [FR] France ..................................... 95 13991

[51] Int. Cl.$^6$ ........................... B32B 27/36; C08G 63/08; C08G 63/84; C08G 63/88
[52] U.S. Cl. ........................... 428/338; 428/339; 428/480; 528/354; 528/357; 264/176.1; 264/211.24
[58] Field of Search ..................................... 428/480, 339, 428/338; 528/354, 355, 357; 264/176.1, 211.24

[56] References Cited

U.S. PATENT DOCUMENTS

| | | | |
|---|---|---|---|
| 3,923,729 | 12/1975 | Clendinning et al. | 260/40 R |
| 3,929,937 | 12/1975 | Clendinning et al. | 260/896 |
| 4,057,537 | 11/1977 | Sinclair | 260/78.3 R |
| 4,190,720 | 2/1980 | Shalaby | 528/354 |
| 5,468,837 | 11/1995 | Wautier | 528/357 |
| 5,656,718 | 8/1997 | Wautier et al. | 528/357 |

FOREIGN PATENT DOCUMENTS

| | | |
|---|---|---|
| 0626405 | 11/1994 | European Pat. Off. . |
| 5132572 | 5/1993 | Japan . |

*Primary Examiner*—Vivian Chen
*Attorney, Agent, or Firm*—Spencer & Frank

[57] ABSTRACT

A poly-ε-caprolactone film whose weight-average molecular mass is equal to at least 75,000 g/mol having a modulus in tension of at least 600 MPa in the transverse and longitudinal direction and a shrinkage not exceeding 1% in both directions below the poly-ε-caprolactone melting zone. The process for producing the poly-ε-caprolactone film comprises online extrusion of the poly-ε-caprolactone through a die having a temperature not exceeding 160° C. immediately following its polymerization using aluminum trialkoxide as initiator. The films according to the invention are suitable for producing films for packaging, for the protection of produce or for diapers.

12 Claims, No Drawings

SEMIRIGID POLY-EPSILON-CAPROLACTONE FILM AND PROCESS FOR PRODUCING IT

FIELD OF THE INVENTION

The present invention relates to a new poly-ε-caprolactone film, more particularly a semirigid poly-ε-caprolactone film having an enhanced dimensional stability below its melting zone, as well as to a process for producing it.

TECHNOLOGY REVIEW

Polymers of ε-caprolactone constitute well-known biocompatible and biodegradable thermoplastic polymers for which the most promising outlets are, precisely because of these specific properties, in the film sector such as films for packaging, films for protecting harvests or films for nappies.

It is also known that for all applications involving the conversion of poly-ε-caprolactones to finished or semifinished articles by using in the molten state, it is highly desirable to have solid poly-ε-caprolactones having weight-average molecular masses ($M_W$) which are high and generally at least equal to about 75,000 g/mol.

Traditionally, thermoplastic polymer films are manufactured by extrusion, in an blown bubble or in a flat die, using polymer granules as starting material.

It has now been observed that the poly-ε-caprolactone films manufactured by extrusion of poly-ε-caprolactone granules of high weight-average molecular masses are relatively flexible: they generally have a tensile modulus of less than 500 MPa, most often of the order of about 300 to 400 MPa.

For numerous applications of poly-ε-caprolactone films, the specifications impose minimal stress to the yield point or an elastic modulus which cannot be achieved with the relatively flexible films of the prior art.

It is known that the rigidity of a thermoplastic polymer film can be increased by subjecting the film to stretching in the longitudinal and/or transverse direction. However, the rigidification resulting from it generally occurs at the expense of the elongation at rupture. Furthermore, the films thus stretched undergo substantial shrinkage at temperatures below the melting zone of the constituent polymer, the said shrinkage generally exceeding 2%.

SUMMARY OF THE INVENTION

The present invention aims to provide new poly-ε-caprolactone films which are more rigid and exhibit an enhanced dimensional stability.

To this end, the invention relates to a semirigid poly-ε-caprolactone film whose weight-average molecular mass ($M_W$) is equal to at least 75,000 g/mol, characterized in that it has a modulus in tension of at least 600 MPa in the longitudinal and transverse direction and a shrinkage not exceeding 1% in both directions below the poly-ε-caprolactone melting zone.

DETAILED DESCRIPTION OF THE INVENTION

Poly-ε-caprolactone is understood to designate, for the purposes of the present invention, both the homopolymers of ε-caprolactone and the copolymers of ε-caprolactone with other lactones with a predominant content of ε-caprolactone, such as, for example the copolymers of ε-caprolactone and of β-propiolactone or alternatively of ε-caprolactone and of δ-valerolactone with a predominant ε-caprolactone content. It is therefore understood that the poly-ε-caprolactone films according to the invention may consist both of homopolymers and of copolymers of ε-caprolactone. However, these films preferably consist of homopolymers of ε-caprolactone.

Tensile modulus is understood to mean, for the purposes of the present invention, the modulus in tension evaluated according to the ISO527-3/1993 standard at the pull rate of 1 mm/min on type 2 test pieces.

Most often, the poly-ε-caprolactone film according to the invention has a tensile modulus of at least 700 MPa in the longitudinal direction and in the transverse direction and still more particularly of at least 700 MPa in the longitudinal direction and of at least 850 MPa in the transverse direction. In general, the modulus in tension does not exceed 2000 MPa. Most often, it does not exceed 1500 MPa.

Preference is moreover given to poly-ε-caprolactone films having a shrinkage not exceeding 0.5% in both directions below the poly-ε-caprolactone melting zone. As a guide, this melting zone is situated at 59°–64° C. for the homopolymer of ε-caprolactone.

In spite of their increased rigidity, the new semirigid poly-ε-caprolactone films according to the invention exhibit, in addition, a high elongation at rupture. The elongation at rupture is evaluated according to the above-mentioned ISO standard and on the same type of sample but with a pull rate of 500 mm/min. In general, the elongation at rupture as defined and expressed in % ($\epsilon_B$) is such that the product of the modulus in tension in the transverse direction expressed in MPa ($E_T$) times the elongation ratio expressed in % ($\epsilon_B$) is greater than 300,000 MPa. Most often, the product $E_T \cdot \epsilon_B > 400,000$ MPa.

The thickness of the poly-ε-caprolactone films according to the invention generally does not exceed 0.75 mm. Most often, it does not exceed 0.5 mm and, preferably, does not exceed 0.25 mm.

Moreover, preference is given to the poly-ε-caprolactone films whose weight-average molecular mass is at least 80,000 g/mol and still more particularly at least 90,000 g/mol. In general, the weight-average molecular mass of the poly-ε-caprolactones constituting the films according to the invention does not exceed 200,000 g/mol. Most often, it does not exceed 150,000 g/mol and more particularly 130,000 g/mol.

Particularly preferred films are, moreover, those consisting of poly-ε-caprolactones obtained by polymerization using aluminium trialkoxide as initiator. Aluminium trialkoxide is understood to mean any organoaluminium compound containing three aluminoxane-carbon linkages (>Al—O—C) and mixtures of such compounds.

The use of aluminium trialkoxides to produce poly-ε-caprolactones of high average molecular masses by continuous polymerization of ε-caprolactone as a molten mass in an extruder (process commonly designated by the term "reactive extrusion polymerization") is described in Patent Application EP-A-0,626,405 which is owned by the assignee of the instant application. According to this document, the rods extruded at the outlet of the extruder (acting as polymerization reactor) are cooled before being granulated for subsequent use. As mentioned above, the poly-ε-caprolactone films manufactured from granules have modulus in tension values of the order of 300 to 400 MPa.

The invention also relates to a process for producing a poly-ε-caprolactone film according to the invention.

According to this process, the poly-ε-caprolactone is extruded directly on-line with its manufacture using aluminium trialkoxide as initiator through a die at a temperature not exceeding 160° C.

Preferably, the temperature of the material in the die does not exceed 150° C. It is advantageously from 120° to 140° C.

Although any type of die suitable for the extrusion of thermoplastic films, such as for example a ring die (for the manufacture of blown films) or a flat die may be suitable for the extrusion of the poly-ε-caprolactone film according to the process of the invention, preference is given to a flat die.

It is moreover essential that the poly-ε-caprolactone subjected to the extrusion is substantially anhydrous and does not contain more than 500 mg of water per kg of poly-ε-caprolactone. Most often, it will not contain more than 100 mg thereof and still more particularly not more than 50 mg thereof per kg of poly-ε-caprolactone.

A surprising aspect of the process of the invention consists in the fact that, all else being equal, the extrusion of the film directly on-line with the manufacture of poly-ε-caprolactone leads to an appreciable rigidification and to an enhancement of the dimensional stability of the films compared with the films produced by extrusion of granules of the same poly-ε-caprolactone.

The manufacture of poly-ε-caprolactone using aluminium trialkoxides which precedes the on-line extrusion of a poly-ε-caprolactone film according to the process of the invention may be carried out in any type of reactor, such as a continuous reactor or a batch reactor. In this latter case, a gear pump will be fitted which feeds a die at the outlet of the batch reactor. It is preferable, however, to manufacture the poly-ε-caprolactone by continuous polymerization of ε-caprolactone in a molten mass in an extruder (that is to say by reactive extrusion). In this case, a die and, preferably, a flat die will be fitted at the outlet of the extruder. In a manner known per se, the film leaving the die is cooled on a chill roll, after which the film is rolled up on a mandrel.

The nature of the trialkoxides which can be used for initiating the polymerization of the ε-caprolactone is not particularly critical as long as these are organo-aluminium compounds containing three aluminoxane-aluminium linkages (>Al—O—C).

By way of examples of such trialkoxides, there may be mentioned those described in Patent EP-A-0,626,405 corresponding to the general formula below:

$$R—O—Al—O—R' \quad \text{(I)}$$
$$\quad\quad|$$
$$\quad\quad O$$
$$\quad\quad|$$
$$\quad\quad R''$$

in which:
—R, R' and R" represent, independently of each other, a linear or branched hydrocarbon radical containing from 1 to 16 carbon atoms, preferably from 2 to 8 carbon atoms.

Preferably, R, R' and R" are identical and represent a linear or branched alkyl radical containing from 2 to 6 carbon atoms.

It is understood that the trialkoxides of this type may be prepared "in situ" using trialkyl aluminium and alcohols.

By way of representative examples of type (I) trialkoxides, there may be mentioned aluminium triisopropoxide and aluminium tri-sec-butoxide.

By way of examples of trialkoxides which can also be used, there may be mentioned the aluminium trialkoxides in which at least one alkoxy radical comprises, in addition to the oxygen atom which constitutes the aluminoxane linkage (Al—O), at least one other oxygen atom, the latter being preferably present in the form of an ester functional group or an ether functional group.

By way of examples of aluminium trialkoxides containing an ether bond, there may be mentioned the trialkoxides corresponding to the statistical general formula:

$$(R_1—O)_{3-n}—Al—(O—R_2—O—R_3)_n \quad \text{(II)}$$

in which:
n represents a number from 1 to 3, $R_1$ represents a linear or branched alkyl radical containing from 1 to 10 carbon atoms, preferably from 2 to 8 carbon atoms, $R_2$ represents a linear or branched alkylene radical containing from 1 to 10 carbons atoms, preferably from 2 to 8 carbon atoms, $R_3$ represents an alkyl or aryl radical containing from 1 to 6 carbon atoms, preferably an alkyl radical containing from 1 to 4 carbon atoms.

By way of representative example to type (II) trialkoxides, there may be mentioned tri(methoxyethoxy) aluminium.

By way of examples of aluminium trialkoxides containing an ester bond, there may be mentioned the trialkoxides corresponding to the statistical general formula:

$$R_4—X_n—O—Al—O—X_p—R_5 \quad \text{(III)}$$
$$\quad\quad\quad\quad\quad|$$
$$\quad\quad\quad\quad\quad O$$
$$\quad\quad\quad\quad\quad|$$
$$\quad\quad\quad\quad\quad X_m$$
$$\quad\quad\quad\quad\quad|$$
$$\quad\quad\quad\quad\quad R_6$$

in which:
X represents a radical derived from the ε-caprolactone of formula $$—(CH_2)_5—C—O—$$
$$\quad\quad\quad\quad ||$$
$$\quad\quad\quad\quad O$$

in which n, m and p represent, independently of each other, integers from 0 to 12 of which the sum equals at least 1 and does not exceed 12 and preferably equals at least 3 and does not exceed 10, $R_4$, $R_5$ and $R_6$ represent, independently of each other, a linear or branched alkyl radical containing from 1 to 10 carbon atoms and are preferably identical and represent a linear or branched alkyl radical containing from 2 to 8 carbon atoms.

By way or representative example of type (III) trialkoxides, there may be mentioned the trialkoxide in which the sum n, m and p equals 8 and $R_4$, $R_5$ and $R_6$ represent the sec-butyl radical.

The quantity of polymerization initiator to be used in the polymerization of the ε-caprolactone depends essentially on the desired weight-average molecular masses ($M_W$). A practically linear relationship exists, independent of the polymerization temperature, between the ratio of the quantities of lactone and initiator used and the weight-average molecular mass ($M_W$) of the poly-ε-caprolactone produced, such that it is easy to calculate the relative quantities of initiator to be used. Accordingly, in the case of the continuous manufacture of ε-caprolactone in an extruder, the relationship between the rates of supplying the extruder with lactone and with initiator corresponds to the following equation:

$$M_w = \frac{2.25}{n} \times \frac{\text{lactone feeder rate (in g/min)}}{\text{initiator feeder rate (number of moles of Al/min)}}$$

in which n represents the number of aluminoxane-carbon linkages present in one mole of initiator.

The general conditions for the polymerization in molten mass of the ε-caprolactone using aluminum trialkoxides as defined above are those described in Patent Application EP-A-0,626,405.

Ideally, all the reagents used in the polymerization should be substantially anhydrous. However, residual water contents not exceeding 100 mg/kg of lactone and still more particularly not exceeding 50 mg/kg of lactone may be tolerated because they do not have a significant influence on the weight-average molecular mass of the poly-ε-caprolactones.

Given that the polymerization temperature does not have a significant effect on the average molecular masses of the poly-ε-caprolactones produced, it can fluctuate widely without any disadvantage and it should not necessarily be the same in the different zones of the polymerization reactor. However, it is imperative that it is at least equal to the melting temperature of the poly-ε-caprolactones produced. As a guide, the minimum temperature for the homopolymerization of ε-caprolactone is 60° C. Higher temperatures make it possible to accelerate the rate of polymerization. In practice, the temperature will generally not exceed 160° C. and, preferably, will not exceed 150° C., so as not to have to carry out an intermediate cooling between the manufacture of the polylactone and its on-line extrusion through a die to produce the films according to the invention. In this temperature zone, conversion rates and yields close to 100% are generally obtained for mean residence times of the reaction mass in the reactor not exceeding about 15 minutes and most often not exceeding 10 minutes, or even 5 minutes.

It is understood that various customary additives such as, for example, thermal stabilizers and antioxidants, nucleating agents, so-called antiblocking agents and fillers may be incorporated into the poly-ε-caprolactones. These additives will be advantageously incorporated into the molten poly-ε-caprolactone at the end of polymerization and before extrusion through a die. The additives used in the extrusion of poly-ε-caprolactone films will be substantially anhydrous. The presence of a total quantity of water ranging up to 1 g of water per kg of the poly-ε-caprolactone mixture plus additive(s) subjected to the extrusion can be tolerated.

By way of nonlimiting examples of thermal stabilizers and antioxidants, there may be mentioned products of the substituted phenol type such as tetrakis[methylene-(3,5-di-t-butyl-4-hydroxydihydrocinnamate)]methane or alternatively 4,4'-butylidenebis(6-t-butylmethacresol), as well as carbodiimides. By way of nonlimiting examples of nucleating agents, there may be mentioned boron nitride or di-p-ethylbenzylidene sorbitol and as antiblocking agent, silica. The abovementioned additives will, where appropriate, be incorporated in the customary quantities. In general, the total quantity of the abovementioned additives will not exceed 5 parts per 100 parts by weight of poly-ε-caprolactone.

As regards the fillers which may be incorporated into the poly-ε-caprolactones, these may, for example, be chosen from calcium carbonate (natural or precipitated), calcium sulphate (preferably in anhydrous form), dolomite, talc, kaolin. Organic fillers such as starch (plasticized or nonplasticized), sawdust, cellulose and its derivatives or alternatively ground recycled paper. These fillers may, where appropriate, have undergone a surface treatment to facilitate their dispersion in the poly-ε-caprolactone. Among the abovementioned fillers, preference is given to inorganic fillers and in particular to natural calcium carbonate. In general, the quantity of filler(s) incorporated into the poly-ε-caprolactone will not exceed 150 parts by weight and most often 100 parts by weight per 100 parts by weight of poly-ε-caprolactone.

The present invention also relates to a filled semirigid poly-ε-caprolactone film whose weight-average molecular mass is equal to at least 75,000 g/mol and which has a modulus in tension of at least 600 MPa in the longitudinal and transverse direction and a shrinkage not exceeding 1% in both directions below the poly-ε-caprolactone melting zone. The filled poly-ε-caprolactone film may contain up to 150 parts of fillers per 100 parts by weight of poly-ε-caprolactone. These will be advantageously chosen from inorganic fillers such as, for example, natural calcium carbonate.

EXAMPLE

The example which follows is intended to illustrate the invention.

It relates to the manufacture of an ε-caprolactone homopolymer film by extrusion through a flat die fitted directly at the outlet of a contrarotatory twin-screw extruder (of the Plastirecroder PL-2000 BRABENDER type) constituting the continuous polymerization reactor in which the ε-caprolactone is polymerized using a initiator consisting of a trialkoxide comprising a type (III) ester functional group in which the sum of n, m and p equals 8 and $R_1$, $R_2$ and $R_3$ all three represent a sec-butyl radical.

This initiator, which was prepared by adding at 25° C. ε-caprolactone to aluminium tri-sec-butoxide in a molar ratio of 8:1 contains 0.86 mol of aluminium per kg.

The barrel of the extruder is divided into four zones of the same length, which are at the following temperatures:

zone 1: 85° C.

zone 2: 135° C.

zone 3: 130° C.

zone 4: 130° C.

The extruder is provided with a flat die 260 mm wide, inclined at 45° C. downwards relative to the axis of the extruder. The die temperature is maintained at 140° C. A drum chill roll, refrigerated at 0° C., receives the film at the outlet of the die. The film is then rolled up on a mandrel.

The ε-caprolactone is introduced continuously at room temperature into zone 1 of the extruder via a positive displacement pump at the rate of 5.7 kg/h. The initiator, preheated to 90° C. is continuously introduced separately into this same zone by means of a diaphragm pump in a quantity such that the mass ratio between the ε-caprolactone and initiator feed is equal to 121. The calculated weight-average molecular mass is therefore approximately 105,000 g/mol. The rate of rotation of the screw is kept constant and equal to 20 rpm. The temperature of the poly-ε-caprolactone measured at the outlet of the screw (polymerization temperature) is 132° C. The mean residence time in the extruder is estimated at about 2 minutes.

The poly-ε-caprolactone film produced has a thickness of 0.15 mm.

The measured weight-average molecular mass ($M_W$) of the PCL is 110,000 g/mol and the $M_W/M_n$ ratio=2.25.

The modulus in tension of the film is evaluated according to the ISO527-3/1993 standard on type 2 test pieces with a pull rate of 1 mm/min.

The elongation at rupture is evaluated according to the same standard on the same type of test pieces with a pull rate of 500 mm/min.

The mean values measured on 5 samples are the following:

tensile modulus (E):
  950 MPa in the longitudinal direction (direction of extrusion)
  1230 MPa in the transverse direction elongation at rupture expressed in % ($\epsilon_B$):
  670 in the longitudinal direction
  485 in the transverse direction The product of E (MPa) times ($\epsilon_B$) is
  636,500 MPa in the longitudinal direction
  595,550 MPa in the transverse direction.

The dimensional stability of the film at 57° C. is, moreover, evaluated in the following manner: a square film of sides 100 mm is cut with an edge parallel to the direction of use. The sample, placed on a smooth surface coated with talc to avoid any adhesion is then introduced for 15 minutes into a ventilated oven at 57° C. The dimensions of the sample are measured before and after the treatment, along a straight line drawn about 2 cm from each edge (4 measurements per sample). The following changes in dimension were observed after this treatment (mean values for 2 samples with 4 measurements per sample):

longitudinal direction: +0.2% transverse direction: −0.3%

For comparison, the tensile modulus, the elongation at rupture and the dimensional stability of a biorientated film 0.18 mm in thickness, made from commercial poly-$\epsilon$-caprolactone (sold under the trademark CAPA, type 680) whose weight-average molecular mass is 120,000 g/mol, were measured under the same conditions as those mentioned above. This film was obtained by biaxial stretching of a plate having a thickness of 1 mm extruded from granules of poly-$\epsilon$-caprolactone.

A sample of sides 17 cm collected from the plate was stretched at a constant speed of 3 m/min in a ventilated oven at 58° C. after 5 minutes of thermal equilibration. The final dimensions were equal to 3 times the initial size (surface area×9), the thickness being simultaneously reduced to 0.18 mm.

The mean values measured on 5 samples are the following:

modulus in tension (E):
  495 MPa in the longitudinal direction (direction of extrusion)
  510 MPa in the transverse direction elongation at rupture expressed in % ($\epsilon_B$):
  520 in the longitudinal direction
  465 in the transverse direction The produce of E (MPa) times ($\epsilon_B$) is
  257,400 MPa in the longitudinal direction
  237,150 MPa in the transverse direction.

The following changes in dimension were observed: 2.2% shrinkage in both directions.

What is claimed is:

1. A semirigid poly-$\epsilon$-caprolactone film having a weight-average molecular mass is equal to at least 75,000 g/mol, having a modulus in tension of at least 700 MPa in both the longitudinal and transverse directions, having a thickness which does not exceed 0.5 mm, and a shrinkage not exceeding 1% in both the longitudinal and traverse directions below the poly-$\epsilon$-caprolactone melting zone, and wherein the product of the modulus in tension in the transverse direction expressed in MPa times the elongation ratio at rupture expressed in percent is greater than 300,000 MPa.

2. The semirigid poly-$\epsilon$-caprolactone film according to claim 1, wherein the modulus in tension in both the longitudinal and transverse directions does not exceed 2000 MPa.

3. The semirigid poly-$\epsilon$-caprolactone film according to claim 1, wherein the film exhibits a shrinkage not exceeding 0.5% in both the longitudinal and transverse directions below the poly-$\epsilon$-caprolactone melting zone.

4. The semirigid poly-$\epsilon$-caprolactone film according to claim 1, wherein the poly-$\epsilon$-caprolactone has a weight-average molecular mass at least equal to 90,000 g/mol and not exceeding 200,000 g/mol.

5. The semirigid poly-$\epsilon$-caprolactone film according to claim 1, wherein the poly-$\epsilon$-caprolactone is obtained by polymerization using aluminium trialkoxide as initiator.

6. The semirigid poly-$\epsilon$-caprolactone film according to claim 1, wherein the poly-$\epsilon$-caprolactone is a homopolymer of $\epsilon$-caprolactone.

7. The semirigid poly-$\epsilon$-caprolactone film according to claim 1, wherein the poly-$\epsilon$-caprolactone contains up to 150 parts by weight of filler per 100 parts by weight of the poly-$\epsilon$-caprolactone.

8. A process for producing a poly-$\epsilon$-caprolactone film according to claim 1, comprising online extrusion of the poly-$\epsilon$-caprolactone through a die having a temperature not exceeding 160° C. after its polymerization using aluminum trialkoxide as initiator.

9. The process for producing a poly-$\epsilon$-caprolactone film according to claim 8, wherein the temperature of the poly-$\epsilon$-caprolactone in the die is between 120° and 140° C.

10. The process for producing a poly-$\epsilon$-caprolactone film according to claim 9, wherein the die is a flat die.

11. The process for producing a poly-$\epsilon$-caprolactone film according to claim 8, wherein the polymerization of the poly-$\epsilon$-caprolactone preceding the extrusion of the film is carried out by continuous polymerization of $\epsilon$-caprolactone in a molten mass in an extruder.

12. In a process for the manufacture of an $\epsilon$-caprolactone film, the improvement comprising online extrusion of the poly-$\epsilon$-caprolactone through a die having a temperature not exceeding 160° C. after its polymerization using aluminum trialkoxide as initiator to produce a semirigid poly-$\epsilon$-caprolactone film having a weight-average molecular mass at least equal to 75,000 g/mol and not exceeding 200,000 g/mol and a modulus in tension of at least 700 MPa in both longitudinal wherein the product of the modulus in tension in the transverse direction expressed in MPa times the elongation ratio at rupture expressed in percent is greater than 300,000 MPa.

* * * * *